United States Patent [19]
Austin et al.

[11] 3,969,487
[45] July 13, 1976

[54] PROCESS FOR SYNTHESIS OF CHLORODIFLUOROAMINE

[75] Inventors: Thomas E. Austin, Winston-Salem, N.C.; Robert W. Mason, Morris Plains, N.J.

[73] Assignee: Allied Chemical Corporation, Morris Township, N.J.

[22] Filed: Apr. 26, 1963

[21] Appl. No.: 279,696

[52] U.S. Cl. .............................. 423/351; 423/466; 423/472
[51] Int. Cl.² ..................... C01B 21/52; C01B 7/00
[58] Field of Search ............... 23/14, 190; 423/351, 423/466, 472

[56] References Cited
UNITED STATES PATENTS

| | | | |
|---|---|---|---|
| 3,084,025 | 4/1963 | Gardner | 423/351 |
| 3,101,947 | 8/1963 | Freeman et al. | 423/351 |
| 3,134,638 | 5/1964 | Lawton et al. | 423/351 |
| 3,273,975 | 9/1966 | Marshall | 423/351 |
| 3,314,770 | 4/1967 | Knipe et al. | 423/351 |
| 3,472,634 | 10/1969 | Marshall et al. | 423/351 |
| 3,488,163 | 1/1970 | Lawton et al. | 423/351 |

Primary Examiner—Richard E. Schafer
Attorney, Agent, or Firm—Ernest A. Polin; Jay P. Friedenson

[57] ABSTRACT

A process for making chlorodifluoroamine by introducing a mixture of an inert gas and elemental fluorine into a reaction zone containing a mixture or alkali metal azide and alkali metal chloride at a reaction temperature not substantially above 50°C.

10 Claims, No Drawings

PROCESS FOR SYNTHESIS OF CHLORODIFLUOROAMINE

This invention relates to methods for making chlorodifluoroamine, $F_2NCl$, normally a colorless gas having a boiling point of about minus 67° C. and a melting point of about minus 182° C. Chlorodifluoroamine is useful as a chemical intermediate, for example for reaction with mercury, by known methods to make tetrafluorohydrazine, $N_2F_4$, a commercially available material.

An object of the invention is to provide feasible, procedurally simple methods for making chlorodifluoroamine from available raw materials.

In accordance with the invention, it has been found that alkali metal azide, alkali metal chloride and elemental fluorine may be reacted under certain readily controlled, one-step, gas-solid contact conditions to form chlorodifluoroamine. The invention comprises the discovery of the reactability of elemental fluorine and the indicated azides and chlorides, and of certain reaction conditions which conjunctively constitute practicable and easily controlled methods for making chlorodifluoroamine. The alkali metals of the azides and chlorides include sodium, potassium, lithium, caesium and rubidium, preferably sodium and potassium. The alkali metal of the azide and of the chloride may be the same or different, e.g. sodium azide and potassium chloride may be employed. For convenient illustration, the invention is described herein mostly in connection with use of sodium azide ($NaN_3$), sodium chloride, and elemental fluorine, which raw materials constitute a preferred embodiment. Reaction conditions described as to these raw materials may be utilized with respect to the other alkali metals.

The process of the invention may be carried out by a simple one-step, gas-solid contact reaction in which the reactants, aside from the inert diluting gases, preferably consist of elemental fluorine, alkali metal azide, and alkali metal chloride. Mechanics of the reactions taking place are not clear or well understood. It is possible that, in some intermediate reaction phase chlorine azide may form and fluorinate to $F_2NCl$. In general practice, the process of the invention, as exemplified by use of sodium azide and sodium chloride comprises introducing into a reaction zone, containing an $NaN_3$-$NaCl$ mixture having certain $NaN_3$-$NaCl$ weight ratios, an inert gas-elemental fluorine gas mixture having certain inert gas-elemental fluorine volume ratios, maintaining in the reaction zone certain relatively low reaction temperatures, and discharging from the reaction zone gaseous reaction products containing chlorodifluoroamine.

Apparatus employed is relatively simple, and may comprise any reactor suitably designed to facilitate contact of a gas with a body or bed of granulated or comminuted solids. Whichever the type of reactor, the same may be jacketed and equipped with accessories to effect maintenance in the reactor of herein indicated temperatures. The reactor may be provided at one end with valved inlets for metered charging of incoming gaseous elemental fluorine and gaseous diluent, and at the other end with a gas outlet which may be connected to the inlet of a cold trap system associated with refrigerating equipment to maintain the system at desired low temperatures. The final trap is usually provided with a gas vent to permit passage thru the trap of inert diluting gas and other gases uncondensable at the temperatures of refrigeration, and may be equipped with other valved outlets thru which, during a reaction run, liquid condensate may be drawn off to a fractionator, or, following a reaction run, condensate may be fractionated off to recover chlorodifluoroamine and to separate the same from other materials. Apparatus may be made of any suitable material, such as nickel, copper, Monel, and stainless steel, which is corrosive-resistant to the reactants and products and by-products involved.

In accordance with the invention it has been found that operating factors which afford successful reaction control include chiefly weight ratio of $NaN_3$ to $NaCl$; volume ratio of inert gas to elemental fluorine; and temperatures of reaction.

At the outset of practice of the process, the reactor is charged with a mixture of sodium azide and sodium chloride. Such mixture may be made up by grinding together certain proportions of sodium azide and sodium chloride. It has been found that the $NaN_3$-$NaCl$ mixture as used in the reaction initially should contain not less than three weight parts of $NaCl$ per part of sodium azide. While weight proportions of $NaCl$ greater than 10 to one of $NaN_3$ may be employed no particular operating advantage is evident, and it is preferred to utilize, in the initial make-up of the $NaN_3$-$NaCl$ mixture, $NaCl$ in quantity such as to provide a mixture having a weight ratio substantially in the range of one $NaN_3$ to 3–10 $NaCl$. As charged to the reactor, the $NaN_3$-$NaCl$ mixture may be sized in the range of 20 to 200 mesh.

Experience establishes the desirability of use of elemental fluorine diluted with an inert gas such as nitrogen, helium or argon. We find that, in practice of all embodiments of the invention, an inert gas-elemental fluorine gas mixture having an inert gas-fluorine volume ratio of one to not more than 5 may be utilized. It has been further found that in the practice of the better embodiments of the invention, dilution of elemental fluorine with inert gas is a factor related to the procurement of smooth reaction conditions throughout a run. At the outset of a run, it is notably desirable to start up with a greater dilution of fluorine and then, subsequent to establishment of smooth continuous production of chlorodifluoroamine, increase the fluorine concentration of the gas mixture charged to the reaction. Hence, at the beginning of any particular run, it is preferred to charge to the reaction zone an inert gas-fluorine gas mixture having an inert gas-fluorine volume ratio of one to not more than two. In some situations, it may be desirable to continue the run using the foregoing one to not more than two fluorines (volume basis) throughout the length of the run. Since increased dilution of fluorine is conducive to smoother reaction conditions, greater dilution of fluorine may be employed, although to no particular advantage.

We do find, however, that in practice, subsequent to establishment of smooth continuous production of chlorodifluoroamine, it is feasible and advantageous to increase fluorine concentration of the gas mixture charged to the reaction to the above noted inert gas-fluorine volume ratio of one to not more than 5, and such mode of operation is preferred in the interest of increased production of chlorodifluoroamine. Time interval between start up with low fluorine concentration and subsequent increase of fluorine concentration is variable, and to a notable extent is dependent upon variables such as size of operation, etc. A condition of smooth reaction and production of $F_2NCl$ may be gauged by monitoring the reactor off gas. In general, it is preferred to operate with low fluorine concentration for a substantial period, say not less than about 30 minutes.

The reactions of the invention are carried out at relatively low temperatures. Reaction zone temperature may be as high as about 50° C. to produce some $F_2NCl$. However, in the interest of better $F_2NCl$ yield, considerably lower temperatures are desirable. Reaction zone temperature should be held not below about minus 70° C. in order to insure maintenance of the $F_2NCl$ (b.p. minus 67° C.) in vapor phase in the reactor. For best overall operating results and to promote good yields of $F_2NCl$, minimize presence of $ClN_3$ in reactor exit gases, and permit use of greater relative amounts of $NaN_3$, e.g. $NaN_3$-$NaCl$ weight ratio substantially in the range of one $NaN_3$ to 3-6 $NaCl$, preferred reaction zone temperatures are maintained in the range of minus 40-minus 70° C.

Contact time may be varied considerably without particular disadvantage. In any case, gas mixture feed to the reaction zone may be regulated to provide contact time adequate to effect a substantial degree of reaction between fluorine and the azide-chloride mixture to form a substantial amount of $F_2NCl$. Generally, contact time may lie in the range of about 5-120 seconds, preferably about 10-60 seconds. For practicable purposes, contact time, reactor temperature and ratios of reactants are interrelated and depending upon apparatus and the particular operation at hand, and taking into consideration the extent of inert gas dilution of the incoming fluorine, contact time to establish smooth optimum reaction conditions may be determined by test runs.

Aside from inert diluents, the reactor exit contains principally $F_2NCl$, b.p. minus 67° C., possibly some unreacted fluorine, and smaller generally not much more than trace amounts of $SiF_4$, and $CF_4$ b.p. minus 128° C., $NF_4$ b.p. minus 120° C., $N_2O$ b.p. minus 90° C., $ClN_3$ b.p. minus 15° C., and some chlorine. Recovery of chlorodifluoroamine and separation of the same from other materials contained in the gaseous exit of the reaction zone may be effected more or less conventionally as known in this art, i.e. by condensation in a cold trap, followed by suitable fractionation. Except for fluorine, nitrogen or other inert, the reactor exit may be totally condensed in a cold trap refrigerated by means of an isopentane slush bath to e.g. minus 150°-160° C., fluorine, nitrogen or other inert, being vented thru the trap. In subsequent fractionation of cold trap condensate, small amounts of $CF_4$, $NF_3$, $N_2O$ and $SiF_4$ may be removed as overhead, retaining $F_2NCl$ with chlorine and possibly some $ClN_3$ as still bottoms. Thereafter, the $F_2NCl$ may be distilled for separation of any chlorine and $ClN_3$ and for further purification. Alternatively, the reactor exit gas stream may be refrigerated to any low temperature just suitably below the minus 67° C. boiling point of $F_2NCl$, e.g. to dry ice temperature of about minus 78° C. In this situation, $CF_4$, $SiF_4$, $NF_3$ and $N_2O$ are vented off from the cold trap along with nitrogen, fluorine and helium, and at the end of the run the cold trap may be permitted to warm up, and $F_3NCl$ recovered as overhead, leaving any chlorine and/or $ClN_3$ as still bottoms. Further, in a continuous operation condensates may be continuously withdrawn from the cold trap and fractionated in separate equipment.

The following illustrate practice of the invention.

EXAMPLE 1

Apparatus employed comprised a copper U-tube reactor, ⅝ inch I.D. and about 8 inches long. One leg of the tube was provided at the top with a valved inlet and facilities for metered introduction of a gas mixture into the reactor, and the other or outlet leg of the reactor was connected to the gas inlet of the first of three cold traps arranged in series. The trap nearest the reactor was maintained at about minus 79° C. by a dry ice-acetone mixture; the second trap, at about minus 124° C. by an isohexane-liquid nitrogen mixture; and the last trap, at about minus 186° C. by liquid oxygen. About one gram of $NaN_3$ and about 9 grams of $NaCl$ were ground together, and the resulting mixture, of about 5 cc. volume and of about 150 mesh, was charged into the reactor. Over a period of about one hour, there was introduced into the reactor, at a rate of about 30 cc/min a fluorine-nitrogen mixture having a fluorine:nitrogen volume ratio of about 5:1. Rate of feed of the mixture was such that contact time of gas mixture with the $NaCl$-$NaN_3$ mixture in the reactor was about 10 seconds. At the start, temperature in the reactor was about 20° C., and at the end of the run reactor temperature had risen to about 43° C. The condensate collected in each of the three traps was vaporized, and the respective off gases were analyzed by infrared spectrum. The off gas of the minus 79° C. trap contained a dominant proportion of $ClN_3$ plus traces of $N_2O$ and $SiF_4$. The off gases for both the minus 124° C. and the minus 186° C. traps contained $F_2NCl$ plus traces of $N_2O$, $SiF_4$ and $CF_4$; off gas of the minus 186° C. trap also containing trace amounts of $NF_3$. The $CF_4$ is believed to be an impurity contained in the elemental fluorine employed, and the $SiF_4$ probably results from minor reaction of fluorine with glass in the trap system.

EXAMPLE 2

During this run, temperature in the reactor was maintained at about 0° C. All other operating conditions were substantially the same as in Example 1. The condensate collected in each of the three traps was vaporized, and infrared analysis of the respective off gases showed for the minus 79° C. trap, traces of $F_2NCl$, $N_2O$, $SiF_4$; for the minus 124° C. trap, $F_2NCl$ plus traces of $N_2O$, $CF_4$, and $SiF_4$; and for the minus 186° C. trap, traces of $F_2NCl$, $NF_3$ and $CF_4$. The off gas of each of the minus 79° C. and minus 124° C. traps contained a little chlorine.

EXAMPLE 3

The reactor employed was the same as in the above examples. About 2 grams of $NaN_3$ and about 8 grams of $NaCl$ were ground together, and the resulting mixture, of about 5 cc. volume and of about 150 mesh, was charged into the reactor. Over a period of about 2½ hrs. there was introduced into the reactor, at a rate of about 15 cc/min., a fluorine-nitrogen mixture having a fluorine-nitrogen volume ratio of about 2:1. Contact time of gas with the $NaCl$-$NaN_3$ mixture in the reactor was about 20 seconds. Throughout the run, reactor temperature was maintained at about minus 55° C. by means of chloroform-dry ice bath. The exit gas of the reactor, after warming up to about room temperature, was continuously analyzed by infrared spectrum. After about the first 20 minutes of operation, analysis showed the off gas contained $F_2NCl$ plus trace amounts of $ClN_3$, $N_2O$ and $CF_4$. Hence, $F_2NCl$ was produced in good yield, and analysis of the reactor residue showed that only about 1.1% of the nitrogen initially charged into the reactor remained unconsumed.

EXAMPLE 4

In this run, the reactor, total quantities and proportions of $NaN_3$ and NaCl, and reaction temperature were substantially the same as in Example 3. For about the first 25 minutes of the run, there was introduced into the reactor, at a rate of about 15 cc/min., a fluorine-nitrogen mixture having a fluorine-nitrogen volume ratio of about 2:1. Contact time of incoming gas mixture with the $NaCl-NaN_3$ mixture in the reactor was about 20 seconds. Reaction proceeded smoothly and infrared analysis of a reactor exit gas showed the presence of $F_2NCl$ and smaller amounts of $ClN_3$, $N_2O$ and $CF_4$. During a second period of 15 min., there was introduced into the reactor, at a rate of about 30 cc/min., a fluorine-nitrogen mixture having a fluorine:nitrogen volume ratio of about 5:1, and contact time was about 10 seconds. After initiation of the reaction at the slower fluorine feed rate, reaction proceeded smoothly at the increased feed rate, and analyses of the reactor exit gas showed $F_2NCl$ plus trace amounts of $N_2O$ and $ClN_3$. During a succeeding period of four or five minutes, gas flow rate was increased to about 35 cc/min., and the fluorine-nitrogen mixture fed had a fluorine:nitrogen volume ratio of about 6:1, contact time during this interval being about 9 seconds. While infrared analysis of the reactor exit gas showed $F_2NCl$ plus a trace of $N_2O$, it became apparent that reaction was too vigorous, and gas flow rate was cut back to a rate of about 30 cc/min., the fluorine-nitrogen mixture again having a fluorine:nitrogen volume ratio of about 5:1, contact time again being about 10 seconds. Under the latter conditions, the run was continued for about another 125 min., during which time analysis of the reactor exit gas showed $F_2NCl$ plus a trace of $N_2O$. At the end of the run totalling about 170 min., no $F_2NCl$ was being produced, and analysis of the reactor residue showed the same to be NaF.

EXAMPLE 5

In this run, the reactor, the proportioning and total quantities of $NaN_3$ and NaCl, and reaction temperature were the same as in Example 4. The reactor exit gas was fed into a cold trap maintained at temperature of about minus 180° C. by means of liquid oxygen. The reactor exit was totally condensed with the exception of nitrogen which was vented from the cold trap. For about the first 15 minutes of the run, there was introduced into the reactor, at a rate of about 15 cc/min., a fluorine-nitrogen mixture having a fluorine-nitrogen volume ratio of about 2:1. Contact time of the incoming gas mixture with the $NaCl-NaN_3$ mixture was about 20 seconds. Reaction was smooth. During a further period of about 150 min., there was introduced into the reactor at a rate of about 30 cc/min., a fluorine-nitrogen mixture having a fluorine:nitrogen volume ratio of about 5:1, and contact time was about 12 seconds. Reaction proceeded smoothly at the increased feed rate. At the end of the run, the condensate collected in the trap and amounting to about 9.5 grams, was totally vaporized, and analyses of the trap off gas showed $F_2NCl$ and $Cl_2$ as major products plus traces of $NF_3$, $CF_4$ and $SiF_4$. NaF residue in the reactor amounted to about 15.4 gms. Analyses showed that, on the basis of the fluorine consumed, yield of $F_2NCl$ was approximately 40%, the remainder of the fluorine being utilized primarily in converting excess NaCl to NaF and chlorine.

We claim:

1. The process for making chlorodifluoroamine which comprises continuously introducing into a reaction zone — containing a comminuted alkali metal azide-alkali metal chloride mixture having an azide-chloride weight ratio of one to not less than 3 — an inert gas-elemental fluorine gas mixture having an inert gas-fluorine volume ratio of one to not more than 5, maintaining in the reaction zone reactive temperature not substantially above 50° C., and discharging from the reaction zone gaseous reaction products containing chlorodifluoroamine.

2. The process of claim 1 in which reaction temperature is substantially in the range of minus 70°–plus 50° C., and azide-chloride weight ratio is substantially in the range of one alkali metal azide to 3–10 alkali metal chloride.

3. The process for making chlorodifluoroamine which comprises continuously introducing into a reaction zone — containing a comminuted $NaN_3$-NaCl mixture having an $NaN_3$-NaCl weight ratio of one to not less than 3 — an inert gas-elemental fluorine gas mixture having an inert gas-fluorine volume ratio of one to not more than 5, maintaining in the reaction zone reactive temperature not substantially above 50° C., and discharging from the reaction zone gaseous reaction products containing chlorodifluoroamine.

4. The process for making chlorodifluoroamine which comprises continuously introducing into a reaction zone — containing a comminuted $NaN_3$-NaCl mixture having an $NaN_3$-NaCl weight ratio of one to not less than 3 — an inert gas-elemental fluorine gas mixture having an inert gas-fluorine volume ratio of one to not more than 5, maintaining in the reaction zone temperature substantially in the range of minus 70 to plus 50° C., and discharging from the reaction zone gaseous reaction products containing chlorodifluoroamine.

5. The process of claim 4 in which the $NaN_3$-NaCl weight ratio is substantially in the range of one $NaN_3$ to 3–10 NaCl.

6. The process of claim 4 in which reaction zone temperature is maintained substantially in the range of minus 40-minus 70° C.

7. The process of claim 4 in which gas mixture feed to the reaction zone is regulated to provide therein contact time substantially in the range of 10–60 seconds.

8. The process for making chlorodifluoroamine which comprises continuously introducing into a reaction zone — containing a comminuted $NaN_3$-NaCl mixture having an $NaN_3$-NaCl weight ratio of one to not less than 3 — an inert gas-elemental fluorine gas mixture having an inert gas-fluorine volume ratio of one to not more than 2, maintaining in the reaction zone reactive temperature substantially in the range of minus 70 to plus 50° C., discharging from the reaction zone gaseous reaction products containing chlorodifluoroamine, and thereafter, subsequent to establishment of smooth continuous production of chlorodifluoroamine, increasing fluorine concentration of the gas mixture charged to an inert gas-fluorine volume ratio of one to not more than 5, and discharging from the reaction zone gaseous reaction products containing chlorodifluoroamine.

9. The process of claim 8 in which the NaN$_3$-NaCl weight ratio is substantially in the range of one NaN$_3$ to 3-10 NaCl, and reaction temperature is maintained substantially in the range of minus 40-minus 70° C.

10. The process of claim 8 in which the time interval from start-up to increase of fluorine concentration of the gas mixture charged is not less than 30 minutes.

* * * * *